United States Patent
Dudat et al.

(10) Patent No.: US 10,160,009 B2
(45) Date of Patent: Dec. 25, 2018

(54) METHOD AND APPARATUS FOR COATING A PIPE

(71) Applicant: Brugg Rohrsysteme GmbH, Wunstorf (DE)

(72) Inventors: Christian Dudat, Garbsen (DE); Joern Homann, Hannover (DE)

(73) Assignee: BRUGG ROHRSYSTEME GMBH, Wunstorf (DE)

( * ) Notice: Subject to any disclaimer, the term of this patent is extended or adjusted under 35 U.S.C. 154(b) by 53 days.

(21) Appl. No.: 15/196,065

(22) Filed: Jun. 29, 2016

(65) Prior Publication Data
US 2016/0375465 A1    Dec. 29, 2016

(30) Foreign Application Priority Data

Jun. 29, 2015    (DE) .................. 10 2015 110 401

(51) Int. Cl.
*B05D 1/02*    (2006.01)
*B05D 7/22*    (2006.01)
(Continued)

(52) U.S. Cl.
CPC ............... *B05D 7/222* (2013.01); *B05D 1/02* (2013.01); *B29C 44/324* (2013.01);
(Continued)

(58) Field of Classification Search
CPC ...... B05D 7/222; B05D 1/02; B05D 2254/02; B05D 2254/04; B29C 44/324;
(Continued)

(56) References Cited

U.S. PATENT DOCUMENTS 3,570,748 A * 3/1971 Coyle .................... B32B 27/00
156/244.17
3,844,700 A * 10/1974 Sokolow ............... B29B 13/024
425/326.1
(Continued)

FOREIGN PATENT DOCUMENTS

DE    3121773 A1    12/1982
DE    3216463 A1    11/1983
(Continued)

*Primary Examiner* — James Mellott
(74) *Attorney, Agent, or Firm* — Leydig, Voit & Mayer, Ltd.

(57) ABSTRACT

A method for coating a pipe involves applying a coating material of cellular structured extruded thermoplastic material to the pipe and enclosing it on the outside by an outer covering layer of compact plastic. In an extrusion head, the annular opening for supplying coating material can be adjusted to a desired temperature by a region having coolant channels separated from the annular opening by an annular heat exchange surface. Before being applied to the pipe, the flowable coating material is guided along the heat exchange surface and cooled to a temperature just above the solidification temperature thereof. After the coating material leaves the annular opening, the coating material expands in a controlled manner, widening the outer covering layer depending on the adjusted temperature of the coating material, until the coating material begins to solidify. The outer covering layer surface condition can correspond to or be different from the pipe.

15 Claims, 5 Drawing Sheets

(51) Int. Cl.

| | | |
|---|---|---|
| *B29L 9/00* | (2006.01) | |
| *B32B 1/00* | (2006.01) | |
| *B32B 1/08* | (2006.01) | |
| *B29C 44/32* | (2006.01) | |
| *B29C 47/00* | (2006.01) | |
| *B29C 47/02* | (2006.01) | |
| *B29C 47/06* | (2006.01) | |
| *B29C 47/28* | (2006.01) | |
| *B29C 47/86* | (2006.01) | |
| *B29C 47/92* | (2006.01) | |
| *B29L 23/00* | (2006.01) | |
| *B32B 15/00* | (2006.01) | |
| *B32B 15/04* | (2006.01) | |
| *F16L 58/10* | (2006.01) | |
| *F16L 59/14* | (2006.01) | |
| *F16L 9/153* | (2006.01) | |
| *B29K 101/12* | (2006.01) | |
| *B29K 105/04* | (2006.01) | |
| *B32B 5/20* | (2006.01) | |
| *B32B 15/08* | (2006.01) | |
| *B32B 27/06* | (2006.01) | |
| *B29C 63/18* | (2006.01) | |
| *B32B 3/28* | (2006.01) | |
| *B29K 23/00* | (2006.01) | |
| *B29K 67/00* | (2006.01) | |
| *B29K 75/00* | (2006.01) | |
| *B29K 77/00* | (2006.01) | |
| *B29C 44/12* | (2006.01) | |
| *B29K 705/00* | (2006.01) | |

(52) U.S. Cl.
CPC ........ *B29C 47/0042* (2013.01); *B29C 47/021* (2013.01); *B29C 47/065* (2013.01); *B29C 47/28* (2013.01); *B29C 47/86* (2013.01); *B29C 47/92* (2013.01); *B29C 63/18* (2013.01); *B32B 1/08* (2013.01); *B32B 3/28* (2013.01); *B32B 5/20* (2013.01); *B32B 15/04* (2013.01); *B32B 15/046* (2013.01); *B32B 15/08* (2013.01); *B32B 27/065* (2013.01); *B05D 2254/02* (2013.01); *B05D 2254/04* (2013.01); *B29C 44/129* (2013.01); *B29C 2947/92704* (2013.01); *B29C 2947/92904* (2013.01); *B29K 2023/06* (2013.01); *B29K 2023/12* (2013.01); *B29K 2067/006* (2013.01); *B29K 2075/00* (2013.01); *B29K 2077/00* (2013.01); *B29K 2101/12* (2013.01); *B29K 2105/04* (2013.01); *B29K 2705/00* (2013.01); *B29L 2009/003* (2013.01); *B29L 2009/005* (2013.01); *B29L 2023/225* (2013.01); *B32B 2255/06* (2013.01); *B32B 2255/26* (2013.01); *B32B 2266/025* (2013.01); *B32B 2266/0214* (2013.01); *B32B 2266/0257* (2013.01); *B32B 2266/0264* (2013.01); *B32B 2597/00* (2013.01); *F16L 9/153* (2013.01); *F16L 58/109* (2013.01); *F16L 59/143* (2013.01)

(58) Field of Classification Search
CPC . B29C 47/0042; B29C 47/021; B29C 47/065; B29C 47/28; B29C 47/86; B29C 47/92; B29C 2947/92704; B29C 2947/92904; B32B 1/00; B32B 1/08; B32B 15/00; B32B 15/04; B32B 15/046; B32B 2255/00; B32B 2597/00; B29K 2101/12; B29K 2105/04; B29L 2009/003; B29L 2009/005; B29L 2023/225; F16L 9/153; F16L 58/109; F16L 59/143
See application file for complete search history.

(56) References Cited

U.S. PATENT DOCUMENTS

| | | | | |
|---|---|---|---|---|
| 3,941,087 | A * | 3/1976 | Yazaki | ........... B05B 7/16 118/306 |
| 4,507,071 | A * | 3/1985 | Hahn | ........... B29C 47/0023 264/171.27 |
| 4,519,863 | A | 5/1985 | Landgraf et al. | |
| 2007/0227758 | A1 | 10/2007 | Rudi et al. | |
| 2008/0236697 | A1 | 10/2008 | Rudi et al. | |
| 2009/0101225 | A1* | 4/2009 | Buchner | ........... F16L 59/147 138/137 |

FOREIGN PATENT DOCUMENTS

| | | |
|---|---|---|
| DE | 9310530 U1 | 9/1993 |
| DE | 19507110 A1 | 9/1996 |
| DE | 102007015660 A1 | 10/2008 |
| EP | 1840444 A1 | 10/2007 |
| EP | 2053299 A2 | 4/2009 |
| EP | 2620268 A1 | 7/2013 |
| FR | 2625941 A1 | 7/1989 |
| JP | S 54123167 A | 9/1979 |
| JP | H 02081618 A | 3/1990 |
| JP | H 06182849 A | 7/1994 |
| WO | WO 8403066 A1 | 8/1984 |
| WO | WO 0035657 A1 | 6/2000 |
| WO | WO 2004003423 A1 | 1/2004 |

* cited by examiner

METHOD AND APPARATUS FOR COATING A PIPE

CROSS-REFERENCE TO RELATED APPLICATIONS

Priority is claimed to German Patent Application No. DE 10 2015 110 401.6, filed on Jun. 29, 2015, the entire disclosure of which is hereby incorporated by reference herein.

FIELD

The invention relates to a method for coating a pipe.

BACKGROUND

Coated pipes are used, for example, in underground pipe construction. The diameters of the pipes are generally between 90 and 1200 mm, larger diameters also being possible. The pipes consist of a pipe as the carrier pipe, preferably made of steel, but other materials are also possible.

The pipe is preferably surrounded by insulation for mechanical and corrosion protection, the insulation generally being polyethylene as a coating material. For protection against thermal effects, intermediate layers made of rigid foam are also installed.

Jacket systems made of compact extruded thermoplastic materials on metal base pipes, also in combination with auxiliary layers, for example for improving adhesion, are predominantly used as mechanical or corrosion protection. However, these compact jacket systems are found to be highly resistant to bending. A flexible jacket structure is found to be particularly advantageous in particular in the case of flexible pipe systems which are intended for dynamic use. It is also an object of this invention to produce, instead of the compact jacket system produced hitherto, a jacket system having a cellular layer, in order thus to achieve significantly increased flexibility.

Jacket systems having a sandwich structure are also used for thermal insulation. The adhesion of such a sandwich system is of great importance for the pipe statics in the case of underground pipes carrying hot media, in order to ensure that the insulation provided for heat insulation performs its function fully over a long period of time. However, comprehensive tests have shown that such insulation, in particular rigid foam insulation, especially made of polyurethane foam, ages, in particular at high temperatures above approximately 120° C.

WO 2004/003423 A1 discloses an insulated pipe having one or more inner pipes and an insulating foam which surrounds the inner pipe. The pipe has a diffusion-regulating layer which is applied to the outside of the foam.

DE 10 2007 015 660 A1 describes a flexible heat-insulated conduit consisting of at least one medium-carrying inner pipe, an outer pipe surrounding the at least one inner pipe, and a polyurethane-foam-based heat-insulating layer, located between the at least one inner pipe and the outer pipe, in which hollow spheres are added to the polyurethane foam. The flexible polyurethane foam allows a certain amount of compression upon application of a force. The flexural strength of the conduit, in which the plastics inner pipe, the polyurethane foam and the plastics outer pipe form a composite, is thus decreased. The result is that, upon bending of the conduit pipe around tight radii, minimal or no breakages in the foam may be expected.

Furthermore, a flexible heat-insulated conduit is also known from EP 2 620 268 A1, for example. For accelerated hardening, the covering layer is cooled by a liquid coolant, in particular water.

DE 32 16 463 A1 relates to a method for producing a flexible district heating pipe comprising a central carrier pipe made of metal and foam insulation in a plastics jacket, which is extruded continuously as a tube from a thermoplastic material and then immediately cooled.

DE 93 10 530 U1 describes encasing a pipe in PUR foam, and JP H02-81 618 A describes encasing a pipe in foam in a coextrusion process using adhesion promoter with a smooth surface without an outer covering layer.

DE 195 07 110 A1 discloses encasing a pipe in PUR foam. The expanding foam is enclosed by a corrugated protective jacket.

WO 00/35 657 A1 relates to encasing a pipe in syntactic foam and to an extrusion head. The expanding foam follows the smooth protective jacket.

Furthermore, JP S54-123 167 A discloses an extrusion apparatus having a cooling device.

In a known production method, individual carrier pipes are provided with spacers and then a jacket pipe made of polyethylene is fitted. The polyurethane foam is then introduced at high speed into the cavity between the carrier pipe and the jacket pipe, which are situated in a slightly inclined plane, and then subsequently spreads out from top to bottom. A disadvantage of this method is that the polyurethane foam does not spread out in a laminar manner owing to the high injection speed and the long flow path. Turbulences form, which lead to cavitation and to density variations in the pipe. There are also pronounced local differences in the thermal conductivities and the mechanical properties.

In a continuous axial method, the carrier pipe is guided in a U-shaped aluminum foil and the aluminum foil is filled with polyurethane foam. The filled foil is then placed around the carrier pipe and sealed, so that the carrier pipe is jacketed by the polyurethane foam. The polyurethane foam is hardened in a calibration device. Finally, the pipe is jacketed by polyethylene.

In the continuous spiral method, the polyurethane foam is sprayed uniformly onto carrier pipes in a row next to one another while they rotate about their own axis. In a second step, a polyethylene jacket is applied in the form of a spiral to the pipe, which continues to rotate.

In the mixing head pulling technique, the polyurethane foam is introduced into the cavity between a carrier pipe and a jacket pipe by means of a mixing head, the mixing head being inserted into the cavity. The mixing head is pulled through the cavity, the cavity being filled thereby with polyurethane foam.

The high outlay associated with the production of insulation when a jacket pipe is used in addition to the carrier pipe and, in a further step, the insulating foam has to be introduced between the two pipes is found to be a disadvantage.

SUMMARY

An aspect of the invention provides a method for coating a pipe, the method comprising: guiding a coating material, which is flowable and comprises an extruded thermoplastic material having a cellular structure, over a heat exchange surface of an extrusion head; cooling the coating material to a temperature not more than 30K above a solidification temperature of the coating material; applying the coating material to the pipe; and enclosing the coating material on its outside by an outer covering layer comprising a compact plastic.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The invention relates to a method for coating a pipe, in which a coating material made of an extruded thermoplastic material having a cellular structure is applied to the pipe and enclosed on the outside by an outer covering layer of a compact plastic, for example polyethylene. The invention relates further to an extrusion head for carrying out the method.

An aspect of the invention is to provide a substantially simplified production method. A further aspect of the invention is to provide an apparatus for carrying out the method.

According to an aspect of the invention there is thus provided a method for coating pipes, in which, before it is applied to the pipe, thermally plasticized, flowable coating material is guided over a heat-exchange surface of an extrusion head and cooled to a temperature just above its solidification temperature. By cooling the flowable coating material to a specific temperature along a cooling surface, the coating can be produced in a simple manner between the outer covering layer and the outer wall surface of the pipe without the need for a supporting outer sheathing pipe. Instead, by cooling the flowable coating material, the expansion capabilities thereof, or the flow properties, are adjusted to a predetermined value, preferably reduced to a minimum, with the result that the outer covering layer does not have to have dimensionally stable properties but, for example, can likewise be produced in the form of an extrudate and applied to the pipe together with the flowable coating material. In this case, the covering layer limits the radial expansion of the coating material and thus has a shaping effect, without at the same time having to absorb high compression forces. In this manner, the flexibility of the coated pipe can be improved considerably.

It is found to be particularly advantageous here if an amount of a blowing agent corresponding to the desired expansion is added to the thermoplastic material for the coating, in order thus to be able to adjust the expansion of the outer covering layer according to the permissible and expedient load limits of the outer covering layer in a simple manner.

It is further found to be particularly promising if, according to a variant, an inner covering layer of a foil is applied to the pipe between the coating and the pipe. By first applying an inner covering layer to the pipe as a separating layer, it is possible to even out irregularities and at the same time produce a sealing layer in order to prevent substances leaking from the pipe from penetrating the coating. Furthermore, the inner covering layer can also serve to bridge troughs in a corrugated pipe, in order thus to simplify the application of the coating material. The troughs thus remain free of coating material, so that the flexible properties of the pipe remain largely unchanged.

The inner covering layer could be applied in the form of a tube to the pipe. On the other hand, the method is particularly simple to carry out if the inner covering layer, or separating layer, is wound onto the pipe in an overlapping manner. The covering layer can thus be applied to the pipe from a material in strip form with comparatively little outlay. The covering layer is preferably applied in a method step immediately preceding the supply of the coating material, so that the entire coating, including the inner and outer covering layer, can take place in a single method step and the coated pipe can be finished.

Another modification of the invention which is likewise particularly promising is achieved by applying an inner adhesion promoter layer to the pipe between the coating and the pipe, in order thus to ensure reliable adhesion of the coating material and the pipe even in the case of cyclic, elastic deformation of the pipe. Furthermore, variants in which the adhesion promoter layer is applied to the inner covering layer are also possible.

Similarly, according to a further variant, an outer adhesion promoter layer is applied between the coating and an outer covering layer, in order thus to achieve in particular a particularly reliable bond, for example by adhesion, between the coating material and the outer covering layer. The outer adhesion promoter layer can be applied in the same method step as the production of the coating material, for example by producing it in a coextrusion process.

A further variant which is likewise promising is achieved in that the inner or outer adhesion promoter layer is applied by flushing or by spraying, in order thus to simplify application of the adhesion promoter layer in particular in the case of a complex surface condition of the pipe.

Particularly preferably, a variant in which the coating material is supplied through an extrusion opening of an extruder and, after exiting the extrusion opening, expands such that the outer adhesion promoter layer or the outer covering layer widens in a predetermined manner, can be used in practice. In this case, an equilibrium is established in a desired manner between the expansion forces of the coating material and the increasing resistance of the outer covering layer against the continued expansion, as a result of which a self-regulating system is obtained in a surprisingly simple manner.

An embodiment of the method according to the invention in which the coating material, at least an inner adhesion promoter layer or an outer adhesion promoter layer and the outer covering layer are applied simultaneously by the coextrusion process, so that the multilayer coating structure can be produced in a single method step, is particularly suitable in practice. As a result, production can take place particularly quickly and economically and, moreover, requires only a single extrusion apparatus.

Furthermore, it is particularly advantageous in practice if the coating material, at least an inner or outer adhesion promoter layer and the outer covering layer are brought together in an angular extrusion head and applied to the pipe annularly around the pipe, so that the pipe can be supplied continuously without requiring an interruption in the coating process. In addition, pipes having different diameters can be provided with the desired coating by means of the same extrusion head without difficulty.

Polyamide, polybutylene terephthalate, polyethylene terephthalate, polypropylene, polyketone or polyethylene have already proved to be particularly suitable in practice as the coating material. They can be processed with little outlay and have high resilience.

The outer form of the covering layer could extend coaxially with the center axis of the pipe having a smooth wall surface. For different intended uses, it has already been found to be particularly expedient if the outer covering layer is produced with an annularly corrugated structure. Furthermore, a helical shape of the outer covering layer can be produced.

The corrugated structure can, of course, be applied both to hollow cylindrical, smooth pipes and to corrugated pipes, neither the axial position nor the corrugation length of the pipe having to coincide with the corrugated outer covering layer. Preferably, the coating is applied to a pipe having a corrugated structure and having a coating thickness that is smaller than the corrugation height of the corrugated structure of the pipe, parallel to the corrugation of the pipe.

The corrugated form of the outer covering layer in the axial direction of the pipe could be produced by peripheral, annular reinforcements on the outer covering layer, which provide increased resistance to expansion in regions. On the other hand, an embodiment of the invention in which, in order to achieve the corrugated structure of the outer covering layer, the take-off speed, or linear speed, in the direction of the main extension of the pipe is controlled in a pulsed manner is particularly flexible. Because the feed movement of the pipe is not approximately constant but is continuously slowed down and accelerated, a varying amount of coating material, based on a specific length of the pipe, is applied to the pipe. Consequently, there is a radial widening in the region where the supply of coating material is increased, which leads to the desired corrugated form. To that end, the feed movement, which is also referred to as the linear speed, is controlled such that it increases and decreases periodically, in such a manner that a sinusoidal form of the speed is obtained.

Particular preference is also given to a further embodiment of the method in which the pipe or the inner covering layer or separating layer, together with the outer covering layer, enclose the coating in a dimensionally stable manner, and so the coating thickness is reliably maintained even under the action of external forces, for example due to installation in the ground. An undesirable reduction in the coating can therefore reliably be avoided by what is known as compartmentalization.

A further particularly advantageous embodiment of the method according to the invention is achieved by bringing the pipe or the inner covering layer to a temperature below the solidification temperature of the coating material. By the pipe or the inner covering layer having a temperature which is at least 20K below the solidification temperature of the coating material, rapid solidification of the coating material upon application to the pipe is achieved, and so undesirable, uncontrolled flowing of the coating material under the influence of gravity can largely be avoided. For this purpose, a coolant can be guided through the pipe, for example. The rate of production can be increased considerably by the rapid solidification that can thus be achieved.

Cooling preferably takes place in conjunction with the supply of the outer covering layer at a temperature between 5K and 30K, in particular between 5K and 10K, above the solidification temperature of the coating material, so that solidification of the coating material takes place radially both outwards and from the outside inwards, in each case towards the center of the coating. In this manner, undesirable internal stresses in the coating can effectively be reduced.

The object according to the invention is further achieved by an extrusion head for producing a protective layer comprising a plurality of layers on a pipe, in which an annular opening for supplying a coating material is delimited by at least one surface having a heat exchange surface for cooling the supplied coating material. By designing portions of the surface as a heat exchange surface for a liquid or gaseous coolant which is supplied by means of a coolant channel, the flow properties and thus the distribution of the material on the pipe and the time taken for the coating material to solidify can be adjusted. The production of the coating on the pipe is simplified considerably thereby.

The extrusion head is preferably equipped for coextrusion with a plurality of annular openings, the temperatures of which can preferably be adjusted independently of one another, that is to say which can in particular be supplied with a coolant.

The method according to the invention for coating a pipe 1 by means of an extrusion head 2 of an extruder (not shown) will first be described in greater detail below with reference to FIGS. 1 to 4. As can be seen, an internal thermoplastic coating material 6 having a cellular structure, an adhesion promoter layer 7 and an outer covering layer 8 of a compact plastic are applied simultaneously in a concentric layer structure to the continuously supplied pipe 1 through an annular opening 3, 4, 5 in the extrusion head 2. For this purpose, in the extrusion head 2, the annular opening 3 for supplying the coating material 6 can be adjusted to a desired temperature by at least one region 9 having coolant channels 10 which are separated from the annular opening 4 by an annular heat exchange surface 11. In this manner, before it is applied to the pipe 1, the flowable coating material 6 is first guided along the heat exchange surface 11 and cooled to a temperature just above the solidification temperature of the coating material 6. As a result, the coating material 6 expands in a controlled manner as the coating material 6 leaves the annular opening 4, and so the outer covering layer 8 widens only slightly, depending on the adjusted temperature of the coating material 6, until the coating material 6 begins to solidify. In this case, the surface condition of the outer covering layer 8 can correspond to or be different from the form of the pipe 1.

Figure 1:
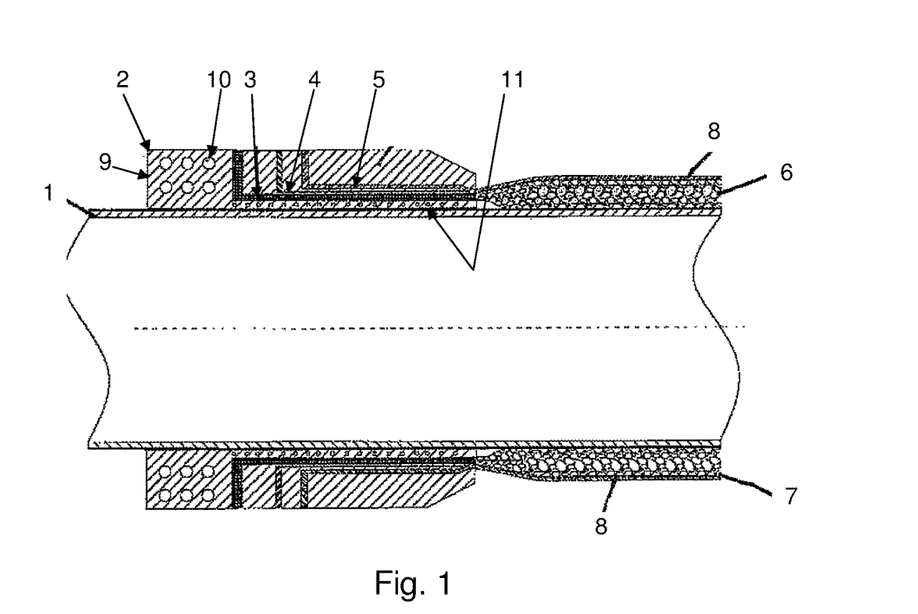
FIG. 1 shows an extrusion head during the coating of a cylindrical pipe.
Figure 2:
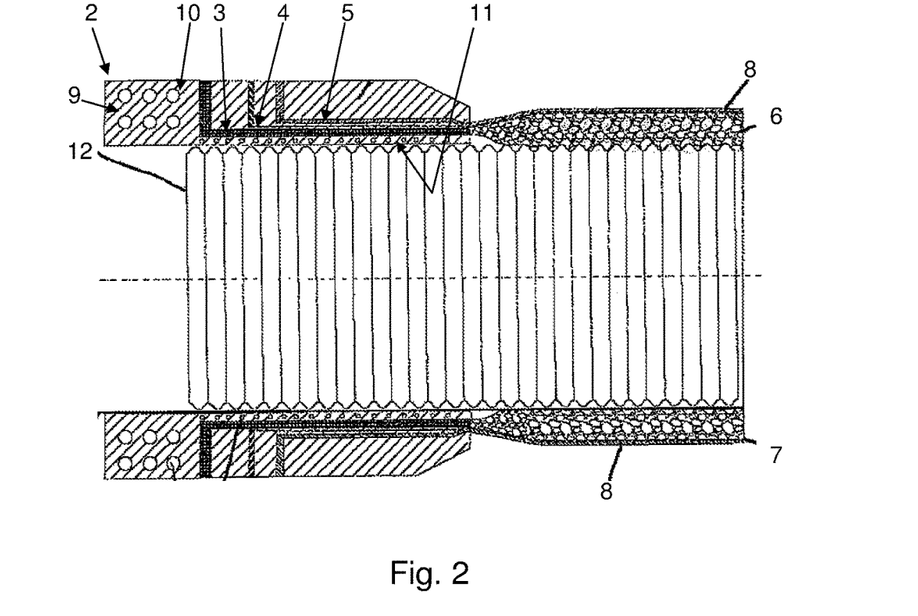
FIG. 2 shows the extrusion head during the coating of a further pipe in the form of a corrugated pipe.

In FIG. 1 there can be seen a concentric arrangement of an outer covering layer 8 which is smooth on the outside and, as can be seen in FIG. 2, can also be produced without difficulty in the case of a pipe 12 in the form of a corrugated pipe.

Figure 3:
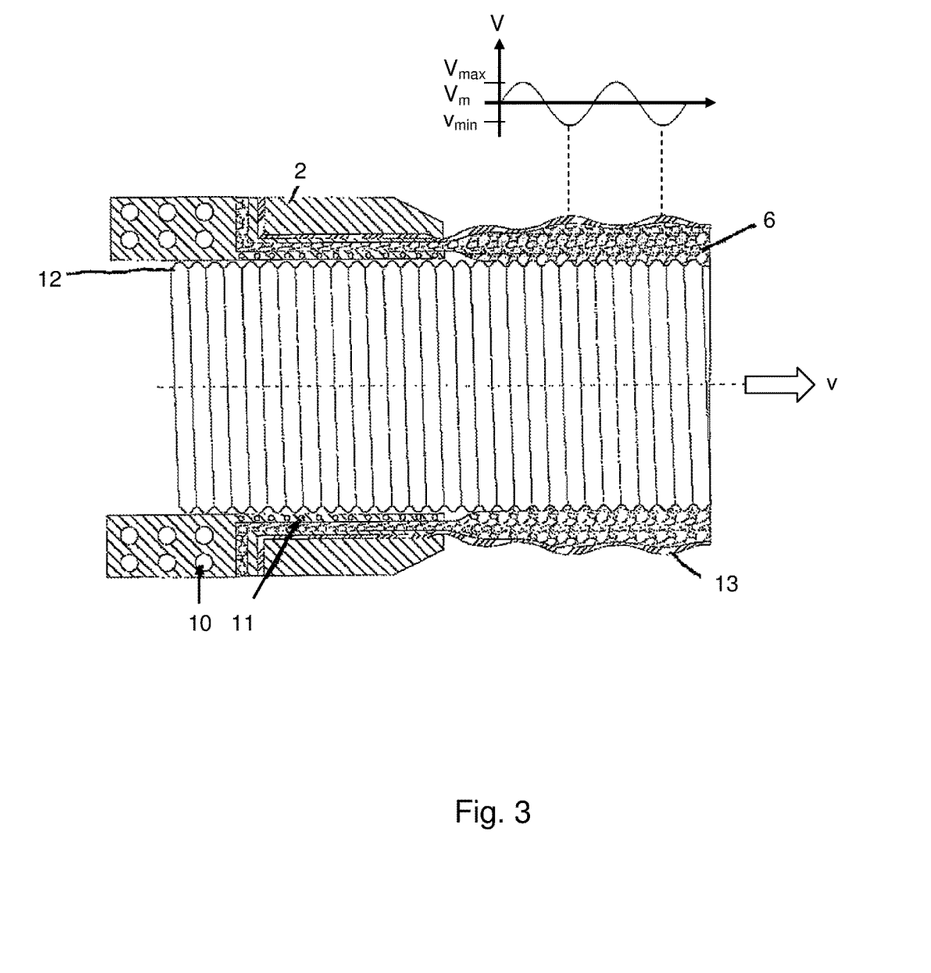
FIG. 3 shows the extrusion head during the coating of the pipe with a corrugated covering layer.

In order to produce a corrugated form of an outer covering layer 13 shown in FIG. 3, merely the speed v of the pipe 12 guided through the extrusion head 2 is changed periodically, as can be seen in the additional diagram shown in FIG. 3. Starting from the mean speed $v_m$, alternate phases of acceleration up to a maximum speed $v_{max}$ and slowing to a minimal speed $v_{min}$ are produced thereby. At a comparatively high speed $v_{max}$, a reduced amount of coating material 6 is accordingly applied, equivalent to a reduced outer circumference of the coating material 6 for generating a trough. On the other hand, a comparatively low speed $v_{min}$ leads to a larger amount of coating material 6 being applied, equivalent to a widened outer circumference of the coating material 6 for generating a peak. In this manner, the form and characteristic of the outer coating material 6 can be controlled individually and almost arbitrarily over the length of the pipe 12, independently of the condition of the pipe 12, by means of the speed v controlled in a pulsed manner.

Figure 4:
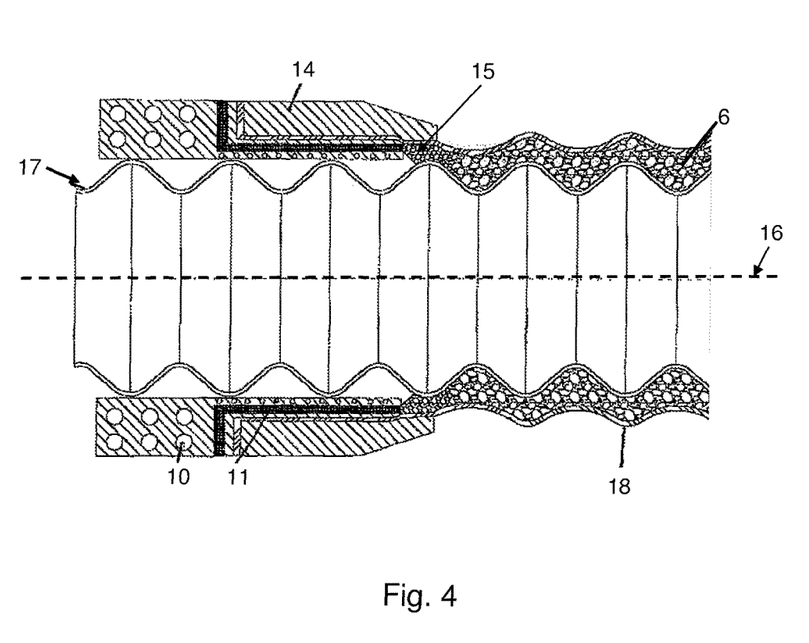
FIG. 4 shows a further extrusion head during the coating of a pipe in the form of a corrugated pipe having particularly deep troughs.

FIG. 4 shows a modified construction of an extrusion head 14 in which a die opening 15 is set back relative to the outer axial extension of the extrusion head 14. In this manner, the exiting flow of coating material 6 is deflected towards a center axis 16 of a corrugated pipe 17. Substantially improved filling of the troughs, which in the example shown are comparatively deep, is achieved thereby. In conjunction with an approximately constant speed of the pipe 17, the troughs and peaks of the pipe 17 are reproduced in an outer covering layer 18 in the corresponding correct positions, having a slightly reduced wave height in comparison.

Figure 5:
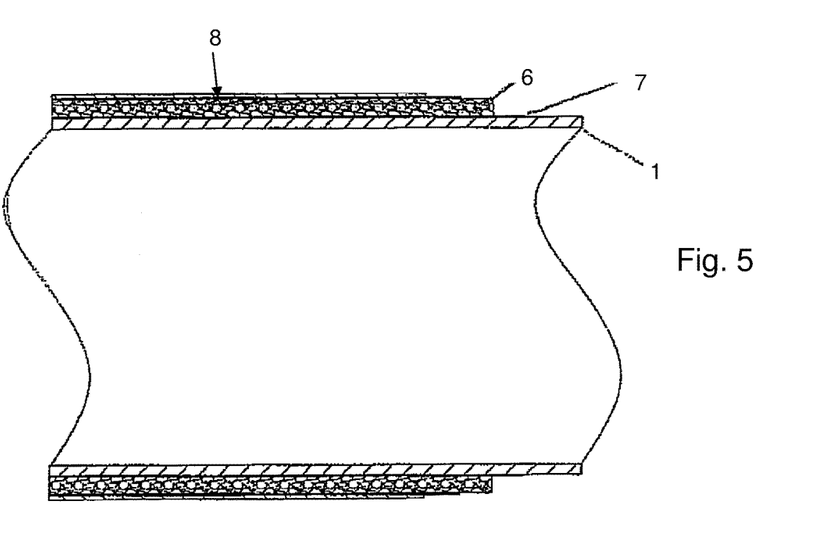
FIG. 5 shows a hollow cylindrical pipe provided with a concentric coating.
Figure 6:
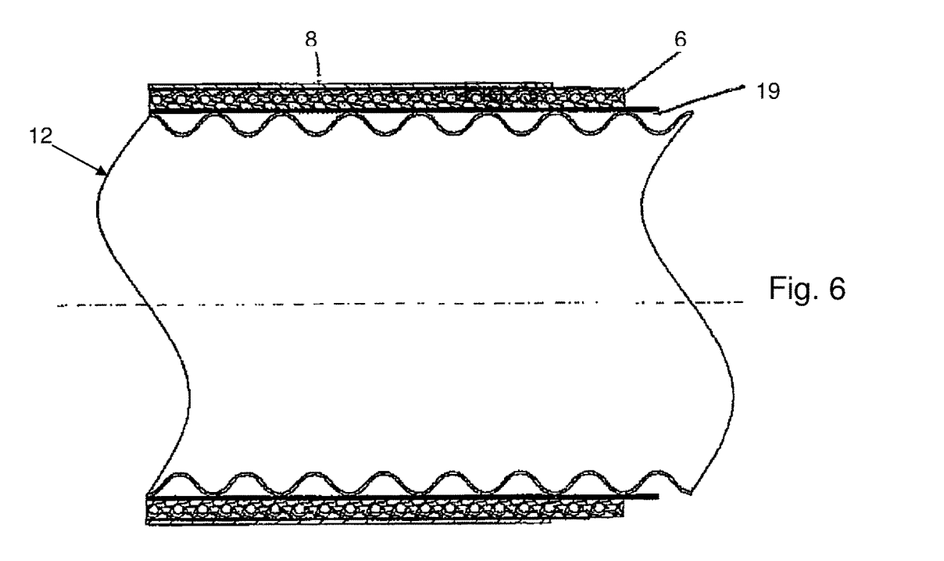
FIG. 6 shows a pipe in the form of a corrugated pipe, provided with a concentric coating.
Figure 7:
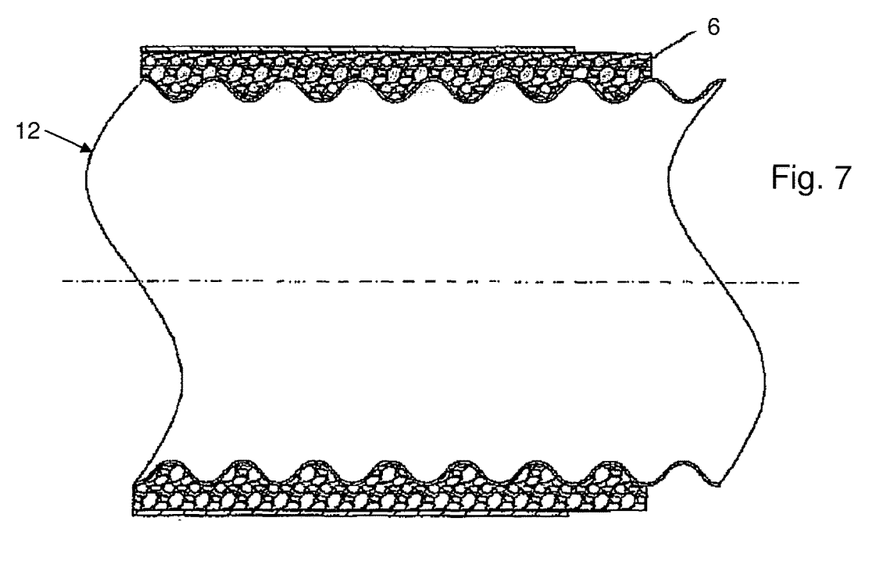
FIG. 7 shows a coating that fills the troughs of a hollow cylindrical pipe in the form of a corrugated pipe.
Figure 8:
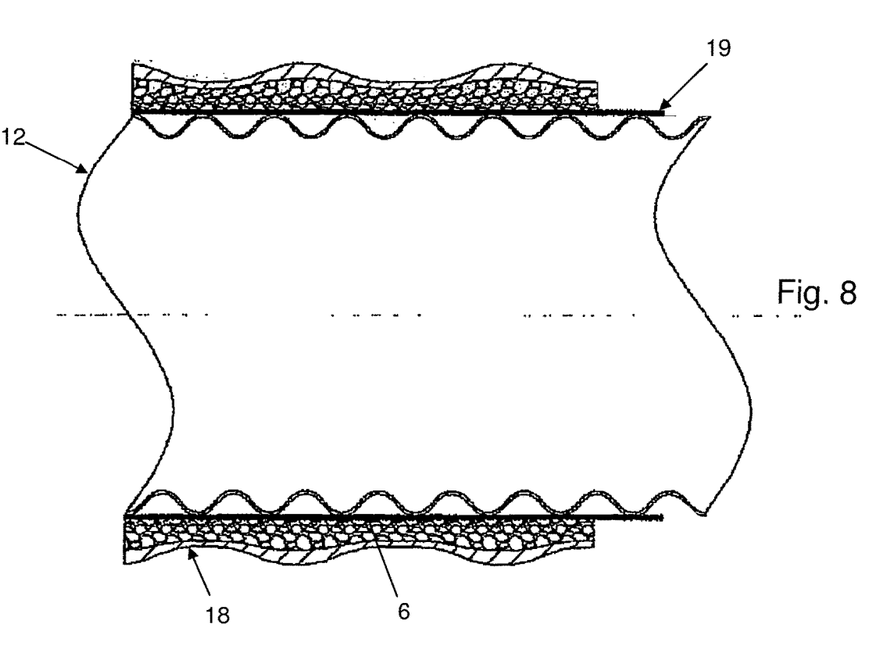
FIG. 8 shows a pipe in the form of a corrugated pipe, provided with a corrugated coating.

FIGS. 5 to 8 show portions of the pipes 1, 12 which are provided in different ways with the coating material 6 described above, the coating shown in FIG. 5 corresponding to the hollow cylindrical form in FIG. 1.

In a manner different therefrom, FIG. 6 shows a coating on the pipe 12 in the form of a corrugated pipe, in which the troughs are kept free of the coating material 6 by a hollow cylindrical inner covering layer 19 as a separating layer. A coating of constant thickness having correspondingly constant insulating values is thus produced over the length.

FIG. 7 shows a coating according to FIG. 2 which fills the troughs of the pipe 12 in the form of a corrugated pipe which, on account of the filling, allows optimum bonding and adhesion of the coating material 6 to the pipe 12.

A variant having reverse shaping is shown in FIG. 8, which shaping is applied in the form of a corrugated coating to the pipe 12 in the form of a corrugated pipe. In contrast to FIG. 6, the outer covering layer 18 has a corrugated form, which can be produced by periodically accelerating and slowing the take-off speed, as described with reference to FIG. 3. The corrugated form can be seen independently of the pipe 12 in the form of a corrugated pipe. Instead, the troughs of the pipe 12 are free of the coating material 6 owing to the hollow cylindrical inner covering layer 19 as a separating layer.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A method for coating a pipe, the method comprising:
    guiding a coating material, which is flowable and comprises an extruded thermoplastic material having a cellular structure, over a heat exchange surface of an extrusion head;
    cooling the coating material to a temperature not more than 30K above a solidification temperature of the coating material;
    applying the coating material to the pipe; and
    enclosing the coating material on its outside by an outer covering layer comprising a plastic,
    wherein the outer covering layer is produced having an annularly corrugated structure by controlling a take-off speed (v) of the pipe in a pulsed manner between a maximum speed ($v_{max}$) and a minimum speed ($v_{min}$) and such that movement of the pipe is continuously accelerated and decelerated.

2. The method of claim 1, wherein the coating material is cooled to a temperature between 5K and 30K above the solidification temperature of the coating material.

3. The method of claim 1, further comprising:
    adding an amount of a blowing agent corresponding to the desired expansion to the coating material,
    wherein the coating material is thermoplastic.

4. The method of claim 1, further comprising:
    applying an inner covering layer to the pipe between the coating material and the pipe.

5. The method of claim 4, comprising:
    winding the inner covering layer onto the pipe in an overlapping manner.

6. The method of claim 1, further comprising:
    applying an inner adhesion promoter layer to the pipe between the coating material and the pipe.

7. The method of claim 1, further comprising:
    applying an outer adhesion promoter layer between the coating material and the outer covering layer.

8. The method of claim 1, further comprising:
    applying an inner adhesion promoter layer and/or an outer adhesion promoter layer by pouring or by spraying.

9. The method of claim 1, comprising:
    supplying the coating material through an annular opening of an extrusion head; and, after leaving the annular opening,
    expanding the coating material such that an adhesion promoter layer and/or an outer covering layer is widened.

10. The method of claim 1, comprising:
    applying the coating material, at least an inner or outer adhesion promoter layer, and the outer covering layer in a coextrusion process.

11. The method of claim 1, comprising:
    bringing the coating material, at least an inner or outer adhesion promoter layer, and the outer covering layer together in an angular extrusion head; and applying the coating material, the at least one inner or outer adhesion promoter layer, and the outer covering layer to the pipe annularly around the pipe.

12. The method of claim 1, wherein the coating material comprises polyamide, polybutylene terephthalate, polypropylene, polyketone, and/or polyethylene.

13. The method of claim 1, wherein the pipe and/or an inner covering layer together with the outer covering layer enclose the coating material in a dimensionally stable manner.

14. The method of claim 1, further comprising:
bringing the pipe and/or the inner covering layer to a temperature below the solidification temperature of the coating material.

15. The method of claim 1, comprising:
applying the outer covering layer at a temperature between 5K and 30K below the solidification temperature of the coating material.

* * * * *